United States Patent [19]

Gerigk et al.

[11] 4,248,912
[45] Feb. 3, 1981

[54] PROCESS FOR PREPARING PACKAGING MATERIAL SUITABLE FOR SAUSAGE CASINGS

[75] Inventors: Günter Gerigk, Oberursel; Wolfgang Klendauer, Wiesbaden; Horst Pietruck, Schwabenheim; Klaus-Dieter Hammer, Mainz, all of Fed. Rep. of Germany

[73] Assignee: Hoechst Aktiengesellschaft, Fed. Rep. of Germany

[21] Appl. No.: 26,517

[22] Filed: Apr. 3, 1979

Related U.S. Application Data

[63] Continuation of Ser. No. 872,696, Jan. 26, 1978, Pat. No. 4,192,904, which is a continuation of Ser. No. 669,811, Mar. 24, 1976, abandoned.

[30] Foreign Application Priority Data

Mar. 24, 1975 [DE] Fed. Rep. of Germany ....... 2512995

[51] Int. Cl.³ ........................... B05D 7/22; B32B 1/08
[52] U.S. Cl. .................................. 427/230; 138/118.1; 426/105; 427/389.9; 427/394; 427/401; 428/36; 428/508; 428/510
[58] Field of Search ................. 428/36, 508, 510, 518, 428/520; 206/802; 426/105, 125; 138/118.1; 427/390, 394, 401, 230

[56] References Cited

U.S. PATENT DOCUMENTS

| | | | |
|---|---|---|---|
| 3,014,004 | 12/1961 | Meier | 428/510 |
| 3,085,901 | 4/1963 | Lindsey et al. | 428/508 |
| 3,794,515 | 2/1974 | Turbak et al. | 428/36 |

*Primary Examiner*—Paul J. Thibodeau
*Attorney, Agent, or Firm*—James E. Bryan

[57] ABSTRACT

Disclosed is a packaging material suitable for manufacturing synthetic sausage casings, comprised of a cellulose hydrate base layer and a layer of vinylidene chloride containing copolymer on the base layer, as well as several methods for preparing the packaging material.

8 Claims, 1 Drawing Figure

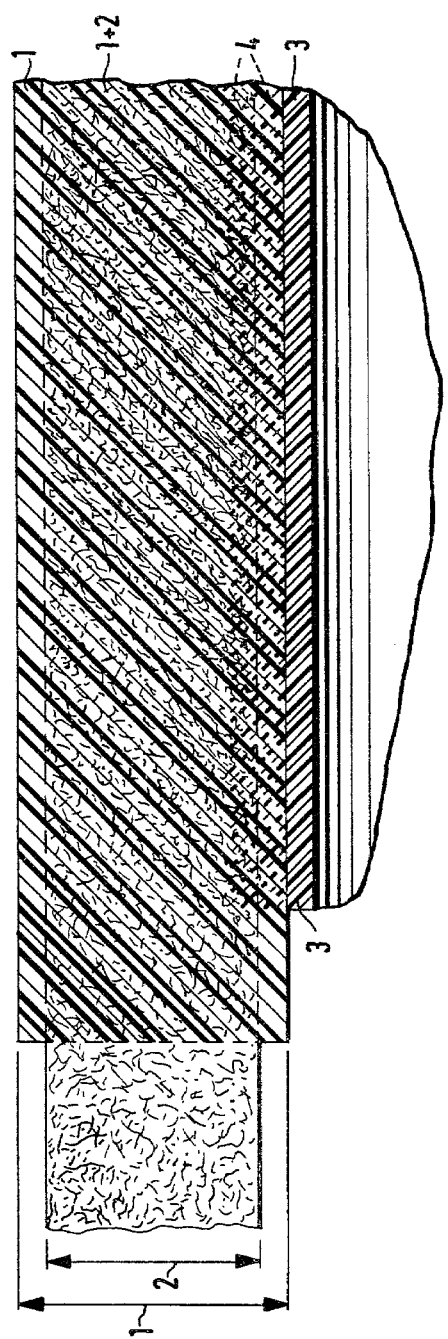

PROCESS FOR PREPARING PACKAGING MATERIAL SUITABLE FOR SAUSAGE CASINGS

This is a continuation of application Ser. No. 872,696, filed Jan. 26, 1978, now U.S. Pat. No. 4,192,904, in turn, a continuation of Ser. No. 669,811, filed Mar. 24, 1976, now abandoned.

BACKGROUND OF THE INVENTION

The present invention relates to a packaging material, preferably in tube form, suitable for the manufacture of casings for pasty goods, preferably for the manufacture of artificial sausage casings, and to a process for preparing such material. More especially, the invention relates to the production of tubular sausage casings having a base layer principally of regenerated cellulose and a surface layer, preferably on the inside of the casing, which is comprised of a vinylidene chloride-containing copolymer and is substantially impermeable to water vapor, oxygen, and flavoring substances. Furthermore, the invention pertains to tubular casings for pasty goods, especially synthetic casings for use in the manufacture of sausages produced from the packaging material. The artificial sausage casings according to the invention are particularly suitable for sausages which are treated with hot water during their manufacture.

Tubular casings according to the invention are particularly well suited for the manufacture of shirred artificial sausage casings which are used in the sausage manufacturing industry and as synthetic sausage casings.

Tubular casings which are commercially utilized as synthetic sausage casings are those based upon cellulose hydrate and these tubes generally have either on their inside or their outside surface a coating layer of vinylidene chloride-containing copolymer. These tubes are available either as rolls or as individual units one end of which is already closed. Tubes which are suitable for use as synthetic sausage casings and which do not carry any barrier layer coating on their surfaces have for many years gathered up or shirred by means of suitable machines well known for this purpose. The procedure is carried out by pleating the tubes in the longitudinal direction into hollow rod-shaped structures. These structures shall be referred to hereinafter as shirred casings. The procedure for producing the shirred casings is known under the designations "shirring" or "gathering".

These shirred casings are then filled with a sausage mixture by means of sausage filling machines of known type, the sausage filling recipe being stuffed into the shirred casing closed at one end, so that the shirred casing is continuously unfolded and extended.

SUMMARY OF THE INVENTION

It is therefore an object of the present invention to provide an improved packaging material suitable for the production of synthetic sausage casings, which material is based primarily upon cellulose hydrate and contains a barrier layer coating of a vinylidene chloride-containing copolymer which is sufficiently impermeable to water vapor, oxygen, and also flavoring substances.

It is also an object of the present invention to provide tubes made of this improved packaging material which are capable of being subjected to shirring in preparation as synthetic sausage casings.

Yet another object of the present invention resides in the provision of improved synthetic casings made from the improved packaging material for sausages that are treated with hot water during their preparation.

In accomplishing these objects, there has been provided in an embodiment according to the present invention a packaging material in the form of a tube suitable for fabricating artificial sausage casings, comprising a base layer comprised of cellulose hydrate and a surface layer on the inside surface of the casing, comprising a vinylidene chloride-containing copolymer containing from 70 to 92 percent by weight of vinylidene chloride and from 8 to 30 percent by weight of a mixture of copolymerizable monomers comprised of an $\alpha,\beta$-unsaturated carboxylic acid, selected from the group consisting of acrylic acid, methacrylic acid, and mixtures thereof, and an ester of said carboxylic acid selected from the group consisting of acrylic acid esters, methacrylic acid esters, and mixtures thereof.

Most preferably, the vinylidene chloride-containing copolymer comprises 90 percent by weight of vinylidene chloride and 10 percent by weight of a mixture of copolymerizable monomers comprised of an $\alpha,\beta$-unsaturated carboxylic acid selected from the group consisting of acrylic acid, methacrylic acid, and mixtures thereof, and an ester of said carboxylic acid selected from the group consisting of acrylic acid esters, methacrylic acid esters, and mixtures thereof, a major portion of said monomer mixture being comprised of the ester.

In another embodiment of the invention, the vinylidene chloride-containing copolymer is comprised of a first copolymer and a second copolymer in a weight ratio between 1:1 and 4:1, the first vinylidene chloride-containing copolymer comprising about 90 percent by weight of vinylidene chloride, 1 percent by weight of acrylic acid, and about 9 percent by weight of acrylic acid methyl ester, and the second vinylidene chloride-containing copolymer comprising about 85 percent by weight of vinylidene chloride, about 2 percent by weight of acrylic acid, about 6 percent by weight of acrylic acid methyl ester, and about 7 percent by weight of acrylic acid butyl ester.

In accordance with another aspect of the present invention, there has been provided a process for the production of a packaging material first defined above, comprising the steps of coating the inside surface of a tube comprised of cellulose hydrate with a layer of vinylidene chloride-containing copolymer, the cellulose hydrate being in gelled condition and the vinylidene chloride-containing copolymer being applied directly to the inside surface in the form of an aqueous dispersion, the copolymer comprising from 70 to 92 percent by weight of vinylidene chloride and from about 8 to 30 percent by weight of a mixture of copolymerizable monomers comprised of an $\alpha,\beta$-unsaturated carboxylic acid selected from the group consisting of acrylic acid, methacrylic acid, and mixtures thereof, an ester of said carboxylic acid selected from the group consisting of acrylic acid esters, methacrylic acid esters, and mixtures thereof, drying said packaging material by means of heat and adjusting the moisture content of the coated tube to a predetermined value by wetting the tube with water.

Also provided according to the invention is a process for the preparation of a sausage casing from the second packaging material defined above, comprising the steps of: coating the inside surface of a tube comprised of cellulose hydrate with a surface layer of a vinylidene chloride-containing copolymer, the cellulose hydrate being in the gelled condition and the vinylidene chloride-containing copolymer being applied directly to the inside surface in the form of an aqueous dispersion, the copolymer comprising 70 to 92, preferably 90, percent by weight of vinylidene chloride and from 8 to 30, preferably 10, percent by weight of a mixture of copolymerizable monomers comprised of an α,β-unsaturated carboxylic acid selected from the group consisting of acrylic acid, methacrylic acid and mixtures thereof, and an ester of the carboxylic acid selected from the group consisting of acrylic acid esters, methacrylic acid esters, and mixtures thereof, a major portion of said monomer mixture being comprised of the ester, drying said packaging material in the form of a tube by means of heat, and finally adjusting the moisture content of the coated tube to a predetermined value by wetting the coated tube with water.

Further provided according to the invention is a process for the preparation of a sausage casing from the third packaging material defined above, comprising the steps of: coating the inside surface of a tube comprised of cellulose hydrate with a surface layer comprising a vinylidene chloride-containing copolymer, the cellulose hydrate being in a gelled condition and the vinylidene chloride-containing copolymer being applied directly to the inside surface in the form of an aqueous dispersion, the copolymer comprising a first copolymer and a second copolymer in a weight ratio between 1:1 and 4:1, the first vinylidene chloride-containing copolymer comprising about 90 percent by weight of vinylidene chloride, 1 percent by weight of acrylic acid, and about 9 percent by weight of acrylic acid methyl ester, and the second vinylidene chloridecontaining copolymer comprising about 85 percent by weight of vinylidene chloride, about 2 percent by weight of acrylic acid, about 6 percent by weight of acrylic acid methyl ester, and about 7 percent by weight of acrylic acid butyl ester, drying the coated packaging material in the form of a tube by means of heat, and finally adjusting the water content of the tube by wetting the tube with water.

DESCRIPTION OF THE PRIOR ART

It is known to render tubular casings composed of cellulose hydrate, especially fibre-reinforced tubular casings consisting of cellulose hydrate, essentially impermeable to water vapor, oxygen, and flavor by coating their surface with vinylidene chloride-containing polymers.

According to the known methods it is necessary to apply an adhesion-promoting layer to the surface of the tube before applying the vinylidene chloride-containing polymer, which adhesion promoting layer consists of a precondensate of aminoplast or chlorohydrin. After drying the adhesion promoting layer, the coating composed of a vinylidene chloride-containing copolymer is applied to it in another step. The adhesion promoting intermediate layer is applied in order to bridge the difference between the surface tension of the polar tube surface composed of cellulose hydrate and that of the coating which is composed of a vinylidene chloride-containing polymer and which is slightly polar, and thus to produce a sufficiently stable bond between the coating and the tube. However, the known method has the disadvantage that it requires an additional step for coating and thus another one for drying and is technologically expensive.

The known tubes coated on their outside also have the disadvantage that when they are used as artificial sausage casings, fat and gelatin deposit at their inside surfaces and the sausage meat adheres so firmly to the artificial casing that they can not be separated without sausage meat adhering to the inside surface of the casing. Furthermore, it is difficult to produce tightly filled sausages with these sausage casings.

In order to avoid the disadvantages mentioned above, it has been tried to coat the outside of the tubular casing and invert it, before filling it with sausage meat, in such a manner that, after the inversion, the coated surface forms the inner side of the tube. It is true that this method eliminates the disadvantage mentioned above, but the inversion is time-consuming and complicated and brings about the danger of damaging the coating because of the mechanical stress exerted upon the tube. As a consequence, these damaged areas of the coating become permeable to water vapor, oxygen and flavor in an uncontrollable manner, a fact which, in turn, has an adverse effect on the keeping quality of the sausage meat and on the sales figures, because the sausage looks unattractive.

However, only relatively polar vinylidene chloride-containing copolymers, i.e. copolymers that contain a sufficient quantity of polar groups per molecule, adhere satisfactorily to the pretreated surface of the known tubes. Coatings having this material structure have the disadvantage that, when the coating is brought into contact with hot water, its transparency is considerably impaired and the damage is essentially irreparable. This disadvantage is particularly obvious if such casings are used for the production of boiling sausages because it gives the false impression of a deposition of fat on the inside of the boiled sausage. Furthermore, the permeability of a coating composed of this material to water vapor, oxygen, and flavor increases with the portion of strongly polar components in the copolymer.

If vinylidene chloride-containing copolymers are used according to the known process that contain such a small portion of polar components that the disadvantages mentioned above occur very rarely or not at all, the coating does not sufficiently adhere to its support and, moreover, it is brittle, a fact which increases the danger of damaging it by mechanical action during the use of such tubes according to their purpose, especially in the use as artificial sausage casings.

In the case of the known tubes originally coated on their outside, the layer of copolymer adheres exclusively to the precoated layer because of the adhesive force acting between the adjacent surfaces of the two layers.

The pretreatment of the surface of cellulose hydrate with an adhesion promoting intermediate layer, which is necessary according to the known process, is done in order to reduce the extremely high surface tension of the surface of the tube composed of cellulose hydrate—more than 72 dynes/cm—to such an extent that a sufficient adhesion of the coating on the basis of a vinylidene chloride copolymer to the tube is made possible in the first place. It is known that the smaller the difference between the surface tensions of the two layers, the stronger the adhesive force acting between two surfaces.

DETAILED DESCRIPTION OF THE INVENTION

It is the object of the invention to avoid the shortcomings of the prior art and to propose a tube composed of cellulose hydrate that is provided with a coating consisting of vinylidene chloride-containing polymers being sufficiently transparent and impermeable to water vapor, oxygen, and flavor, which coating is arranged directly on the original inside of the tube and firmly adheres to it.

It is another object of the invention to propose a simple method allowing to produce a tube composed of cellulose hydrate by means of one single coating step, the original inside of which tube is provided with a coating that has the above mentioned physical properties and is composed of copolymers of the above mentioned composition and adheres to it directly and firmly.

Other objects, features and advantages of the present invention will become apparent from the detailed description of preferred embodiments which follows, when same is considered together with the drawings attached hereto.

These objects are achieved by a tube on the basis of regenerated cellulose that contains a portion of water and chemical plasticizer and has on its surface a coating composed of a polyvinylidene chloride-containing copolymer and is characterized in that on the original inside surface of the tube, there is arranged a coating that is directly adjacent to and firmly connected with it and is impermeable to gas and transparent, consisting of a copolymer containing vinylidene chloride that is obtained by copolymerization of a mixture of polymerizable monomers and consists of 70 to 92 percent by weight of vinylidene chloride and of 8 to 30 percent by weight of a mixture of monomers, i.e. acrylic acid and acrylic acid ester, or acrylic acid and methacrylic acid ester, or acrylic acid, acrylic acid ester and methacrylic acid ester, or methacrylic acid and acrylic acid ester, or methacrylic acid and methacrylic acid ester, or methacrylic acid, methacrylic acid ester and acrylic acid ester.

Preferred are tubes of the kind mentioned above having fiber-reinforced walls, and the term "tube" in this description also comprises such tubes.

Percentages by weight are based on the overall weight of the mixture of monomers.

"Acrylic acid esters and methacrylic acid esters" are esters of acrylic acid or methacrylic acid and monovalent aliphatic alcohols having from 1 to 12 carbon atoms, in particular methyl alcohol, ethyl alcohol, propyl alcohol, or butyl alcohol.

It is essential for the invention that the copolymers that contain vinylidene chloride and are suitable for the production of the coating have a molecular weight such that a 1 percent by weight solution of such a copolymer in tetrahydrofuran has a relative viscosity of at least 1.8 and a 2 percent by weight solution in tetrahydrofuran has a relative viscosity of at least 3.0.

The invention also relates to a process for the production of a tube in which a liquid aqueous dispersion of polyvinylidene chloride-containing copolymers is continuously applied to the surface of a tube composed of regenerated cellulose, characterized in that a liquid coating consisting of an aqueous dispersion of copolymers is applied to the inside surface of a tube on the basis of cellulose hydrate in its gel state, the dispersed portion of which coating is composed of a copolymer that is obtained by the copolymerization of a mixture of polymerizable monomers, this mixture consisting of 70 to 92 percent by weight of vinylidene chloride and of 8 to 30 percent by weight of a mixture of monomers, i.e. acrylic acid and acrylic acid ester, or acrylic acid and methacrylic acid ester, or acrylic acid, acrylic acid ester and methacrylic acid ester, or methacrylic acid and acrylic acid ester, or methacrylic acid and methacrylic acid ester, or methacrylic acid, methacrylic acid ester and acrylic acid ester, and that the tube is dried by means of heat and then wetted with water.

In a preferred embodiment of the process, an aqueous copolymer dispersion is used the dispersed portion of which consists of a copolymer composed of 90 percent by weight of vinylidene chloride units and of 10 percent by weight of acrylic acid units and acrylic acid ester units, or acrylic acid units and methacrylic acid ester units, or acrylic acid units, acrylic acid ester units and methacrylic acid ester units, or methacrylic acid units and acrylic acid ester units, or methacrylic acid units and methacrylic acid ester units, or methacrylic acid units, acrylic acid ester units and methacrylic acid ester units.

In a particularly preferred embodiment of the process, an aqueous copolymer dispersion is used the dispersed portion of which consists of a copolymer composed of 90 percent by weight of vinylidene chloride units, 1 percent by weight of acrylic acid units or methacrylic acid units, and 9 percent by weight of acrylic acid ester units or methacrylic acid ester units or mixtures of them.

Still more preferred are those dispersed copolymers that are composed of 90 percent by weight of vinylidene chloride units, 1 percent by weight of acrylic acid units, and 9 percent by weight of acrylic acid ester units.

The percentages by weight are based on the total weight of the copolymer. The alcoholic component of the above mentioned esters consists of monovalent aliphatic alcohols having from 1 to 12 carbon atoms, especially of methyl alcohol, ethyl alcohol, propyl alcohol, or butyl alcohol.

It is essential for the process according to the invention that at the moment at which the aqueous dispersion of a vinylidene chloride-containing copolymer is applied to the inside surface of the tube, the tube composed of cellulose hydrate is in its gel state. This is essential because only under this condition does the dispersed portion of the dispersion penetrate the surface of the tube wall in a sufficiently quick and uniform manner, thus causing a particularly firm adhesion of the coating directly to the tube surface.

When a tube on the basis of cellulose hydrate is in its gel state, it has a swelling value in the range of from 290 to 310, this figure indicating the water content of the tube, based on its total weight. The swelling value is ascertained according to a method described in the journal "Färberei- und textiltechnische Untersuchungen", Hermann Agster, Springer-Verlag, 1956, page 400.

The coating on the inner side of the tube is not only directly adjacent to the surface of the inside surface of the tube, but some of it has penetrated into the surface of the inner side of the tube wall and settled there. Due to this special structural connection between the tube wall and the coating, the latter firmly adheres to the wall.

The coating has a thickness corresponding to a weight of the copolymer of 3 to 15 g, preferably 5 to 10 g, per $m^2$ of tube surface.

The coating is regarded as adhering firmly to the surface of the tube if it does not detach itself from its support when the tube is used according to its purpose and is still firmly connected with the surface of the tube after boiling the tube in water for 20 hours and/or after contact of the coating with sausage meat.

The coating can not be removed from the tube surface without one of them being damaged or destroyed.

It is essential that the aqueous vinylidene chloride-containing copolymer dispersion which is used for the production of the coating according to the invention has a surface tension between 30 and 55 dynes/cm preferably between 32 and 42 dynes/cm.

The above mentioned aqueous dispersion has a portion of dispersed substance in the range between 8 and 30 percent by weight, preferably between 10 and 16 percent by weight, based on the total weight of the dispersion. Dispersions having this portion of polymer may easily be obtained by diluting dispersions having higher concentrations with the corresponding amount of water until they have the suitable portion of solid matter, for example by proceeding from a dispersion containing a portion of polymer in the range of from 30 to 65, preferably from 45 to 55 percent by weight.

The aqueous dispersion contains emulsifying agents, preferably in the range between 0.3 and 10 percent by weight, based on the weight of dispersed substance.

Suitable emulsifying agents are alkyl sulfonate and/or alkyl sulfate, aryl sulfonate and/or aryl sulfate, alkyl aryl sulfonate and/or alkyl aryl sulfate.

The coating of the invention is transparent, and its original transparency remains virtually unchanged, even after the effect or hot water (about 80° C.) during a period of time in the range of from 5 to 60 minutes.

The term "coating composed of synthetic polymers capable of forming films" means that for the production of the coating an aqueous polymer dispersion is used the dispersed portion of which is capable of forming a film, if the liquid dispersion is spread on a solid support and the dispersion agent is removed. At or above the film-forming temperature, the particles of solid matter freed from dispersion agent are capable of forming a continuous and solid film. For the polymers containing vinylidene chloride that are used the film-forming temperature thus defined is in the range of from 10° to 30° C., preferably between 15° and 28° C.

The coating may consist of synthetic vinylidene chloride-containing copolymers that are capable of forming a film and are composed of 70 to 92 percent by weight of vinylidene chloride units and 8 to 30 percent by weight of polar acrylic acid units and acrylic acid ester units, or acrylic acid units and methacrylic acid ester units, or acrylic acid ester units, methacrylic acid ester units and acrylic acid ester units, or methacrylic acid units and acrylic acid ester units, or methacrylic acid units and methacrylic acid ester units, or methacrylic acid units, acrylic acid ester units and methacrylic acid ester units per molecule.

The ester units given above consist of the above mentioned acids and aliphatic monovalent alcohols having from 1 to 12 carbon atoms, in particular methyl alcohol, ethyl alcohol, propyl alcohol, or butyl alcohol.

The percentages by weight are based on the total weight of the copolymer. The copolymers are obtained by copolymerization of a mixture of monomers having the above mentioned structure.

The chemical composition of the coating, i.e. the different percentages by weight of its components given above, guarantees a permeability to water vapor of less than 2 g/m$^2$·24 h as well as a permeability to oxygen of less than 16 cm$^3$/m$^2$·24 h·bar and substantial impermeability to flavors. The chemical characteristic of the coating is also responsible, or partly responsible, for the transparency and the film adhesion of the coating directly to the surface.

A coating adhering "directly" to the surface of the tube, especially to the inside surface of the tube, means that there is no adhesion-promoting chemical layer in between that has another chemical structure than the coating or the material forming the tube.

The coating is composed of a polymer obtained by copolymerization of a monomer mixture composed of 70 to 92 percent by weight, preferably 90 percent by weight, of vinylidene chloride and 30 to 8 percent by weight, preferably 10 percent by weight, of acrylic acid and acrylic acid ester, or acrylic acid and methacrylic acid ester, or acrylic acid, acrylic acid ester and methacrylic acid ester, or methacrylic acid and acrylic acid ester, or methacrylic acid and methacrylic acid ester, or methacrylic acid, methacrylic acid ester, and acrylic acid ester, or mixtures of them.

The alcoholic components of the esters mentioned above are aliphatic monovalent alcohols having from 1 to 12 carbon atoms, in particular methyl alcohol, ethyl alcohol, propyl alcohol, or butyl alcohol.

Preferred coatings consist of copolymers obtained by copolymerization of monomer mixtures composed of 90 percent by weight of vinylidene chloride, 1 percent by weight of acrylic acid, and 9 percent by weight of acrylic acid ester or methacrylic acid ester. A particularly preferred coating consists of a copolymer composed of 90 percent by weight of vinylidene chloride units, 1 percent by weight of acrylic acid units, and 9 percent by weight of acrylic acid methyl ester units. Percentages by weight are based on the total weight of the copolymer.

The molecular weights of the copolymers used for the production of the coatings, especially of the copolymer composed of 90 percent by weight of vinylidene chloride units, 1 percent by weight of acrylic acid units, and 9 percent by weight of acrylic acid methyl ester units, are characterized by the steep increase in the relative viscosity of the copolymers, depending on the concentration of a solution of the copolymers in tetrahydrofuran according to the curve "Type a" in the diagram on page 25. Due to the special molecular weights of the copolymers, their crystallization does not exceed a certain crystallization value, which is characterized by a stretchability of the coating of 6 to 10 percent. This means that a self-supporting film composed of the copolymer that forms the coating has a stretchability of approximately 10%, based on its original length. Due to its chemical structure, i.e. the different quantities of the components of the coating, the coating does not become brittle, not even after a longer storage period.

In the description, the terms "acrylic acid ester", "methacrylic acid ester", "acrylic acid ester units" and "methacrylic acid ester units" also comprise mixtures of esters that differ from each other in their different alcohol components, for example acrylic acid methyl ester and acrylic acid butyl ester or methacrylic acid methyl ester and methacrylic acid butyl ester.

If a coating having a higher stretchability than the one given above is desired, for example a coating having a stretchability of 15 to 20 percent, it is preferably produced from a copolymer mixture containing a copolymer A and a copolymer B in a ratio of 1:1 to 4:1, the copolymer A being the above mentioned particularly preferred copolymer having a high portion of vinylidene chloride and the copolymer B being a copolymer that is obtained by copolymerization of a monomer mixture that consists of 85 percent by weight of vinylidene chloride, 2 percent by weight of acrylic acid, 6 percent by weight of acrylic acid methyl ester, and 7 percent by weight of acrylic acid butyl ester.

The molecular weight of the last-mentioned copolymer is characterized in that its relative viscosity depends on the concentration according to curve "Type b" of the diagram (page 25).

These particularly stretchable coatings, too, have the transparency, adhesiveness and impermeability mentioned above.

The term "coating composed of a vinylidene chloride-containing copolymer" also comprises coatings consisting of mixtures of the above mentioned vinylidene chloride-containing copolymers.

The process according to the invention makes use of a new mechanism of coating and can be carried out easily. It is surprising that a tube coating free from turbidity is obtained if a coating dispersion containing glycerin is used. The glycerin in the copolymer dispersion is used in order to prevent that the plasticizer present in the tube is removed from it. The addition of glycerin to the coating dispersion is not essential for the formation of a coating having the above mentioned characteristic properties.

The desired thickness of the coating is obtained in a simple manner by determining the concentration of polymers in the coating dispersion and by the conditions prevailing during the coating process. The process is particularly important for the production of artificial, colorless sausage casings, since in this case the coating must be absolutely free from turbidity.

A description of how the process is carried out is given below. The tube used is, for example, a tube in its gel state on the basis of regenerated cellulose which has in its wall a matrix composed of paper fibers.

A tube-like object is produced continuously, in known manner, by bending, overlapping and bonding the edges of a paper fiber web, which tube-like object is impregnated with a viscose solution with the aid of a known tubular die and is provided with a viscose layer on both sides. The viscose solution used for this purpose has a cellulose content of 7.1 percent by weight, an alkali content of 5.78, a $\gamma$-value of 32.8, and a sodium chloride ripeness of 3.25, as well as a falling ball viscosity of 123 falling ball seconds at 25° C.

The fiber tube impregnated with viscose is then continuously introduced into a precipitating liquid for viscose. Such precipitating liquids are known and consist of aqueous solutions containing mixtures of sodium sulfate and sulfuric acid.

After the action of the precipitating liquid, the tube-like object is guided in known manner through several successive regenerating and washing baths, the regenerating baths consisting of aqueous solutions containing mixtures of sulfuric acid and sodium sulfate at graded quantity ratios. These solutions and their compositions are known and are not the subject of the invention.

Then an aqueous solution of a chemical agent, which is capable of plasticizing regenerated cellulose and is known for this purpose, is caused to act upon the tube, for example by guiding the tube through a tray filled with a liquid containing such an agent dissolved in it. The preferred aqueous plasticizer liquid contains a portion of plasticizer in the range between 5 and 20 percent by weight, preferably between 10 and 15 percent by weight, based on the total weight of the plasticizer liquid. Suitable chemical plasticizers are, for example, glycerin, glycol and polyglycol.

After the treatment with the plasticizer liquid the tube contains a portion of plasticizer in the range between ~and 28 percent by weight, based on the total weight of the tube.

After the action of the aqueous plasticizer liquid on the tube, a liquid layer composed on the above described plastic dispersion is applied to the inner side of the tube, which is in its gel state due to the pretreatment. The coating on the inner side of the tube is formed in the known manner, for example by using a process described in British Pat. No. 1,201,830.

The tube and the liquid layer of dispersion on its inner surface are dried by heat in the range between 90° and 120° C., for example by guiding the tube at a speed of 6 to 10 meters per minute through a drier operated with hot air and having a temperature of 200° to 250° C. at its entry. Drying may also be carried out at temperatures below 90° C., if longer drying periods are accepted.

The dried tube has a remaining water content of 2 to 5 percent by weight, based on the total weight of the tube. After leaving the drier, the tube is again contacted with water in order to obtain a water content in the tube wall that is necessary for the use of the tube according to its purpose. Therefore, the surface of the tube is sprayed with water. The time of contact and the quantity of water are determined in such a manner that after the water treatment the tube has a water content of approximately 7 to 22 percent by weight, preferably of 8 to 12 percent by weight. Furthermore, the tube thus produced contains a portion of plasticizer in the range between 18 and 28 percent by weight, preferably between 20 and 25 percent by weight, based on the total weight of the tube.

Based on the same principle, a cellulose hydrate tube without fiber reinforcement, but with a coating on its inside surface, can be produced by forming a cellulose hydrate tube in the known manner and coating the tube, while it is in its gel state, in the manner described above.

The structure of the tube will now be further described, by way of example only, with reference to the accompanying drawing.

In the drawing, the reference numeral 1 designates the wall of the tube that consists of cellulose hydrate, a portion of water and chemical plasticizer, 2 is a fiber matrix in the tube wall 1, 3 is the coating composed of polymer arranged directly on the surface of the tube wall, and 4 is the polymer that has penetrated into the portion of the tube wall that is near the surface of the wall and that has the same chemical structure and composition as the coating.

The coating 3 is in direct contact with the filling in the hollow space of the tube.

EXAMPLE 1

A viscose solution (cellulose content 7.1 percent by weight, based on the total weight of the solution, alkali content 5.8, $\gamma$-value 32.8, sodium chloride ripeness 3.25, viscosity 123 falling ball seconds at 25° C.) is used for impregnating and coating a tube composed of cellulose fibers. The term "impregnating" in this example and in the entire description of the invention means that the fiber tube is completely penetrated by the cellulose solution, which is on the inside and the outside of the tube in the form of a continuous layer.

Thus, the fiber tube is impregnated and coated with viscose solution in known manner in an apparatus known for this purpose.

After the fiber tube impregnated with viscose has left the coating die, a precipitating liquid acts upon it continuously, which liquid consists of an aqueous solution containing 10 percent by weight of sulfuric acid and 14 percent by weight of sodium sulfate, both figures based on the total weight of the liquid. The tube is then guided successively through each of the compositions mentioned above, however, the concentration of their components is graded. Subsequently, the tube is washed with water before an aqueous plasticizer liquid in the form of a 10 percent by weight aqueous glycerin solution acts upon it, for example by guiding the tube continuously through a tray which is filled with this liquid. The duration of action of the plasticizer liquid on the tube is so calculated that, after this treatment, the tube contains a portion of about 22 percent by weight of glycerin, based on its total weight. The cellulose tube thus treated is in its gel state and its swelling value is 300%. The tube has a diameter of 60 mm., 9 liters of a 14 percent by weight aqueous dispersion are filled into a certain portion of the gel tube, the aqueous dispersion having a portion of polymer composed of a copolymer consisting of 90 percent by weight of vinylidene chloride, 1 percent by weight of acrylic acid, and 9 percent by weight of acrylic acic methyl ester.

The relative viscosity of the copolymer depends on its concentration in tetrahydrofuran and corresponds to the curve "Type a" in the diagram on page 25.

The aqueous dispersion furthermore contains 4 percent by weight of glycerin, based on its total weight, and 10 mg of silicone defoaming agent, based on 100 liters of dispersion.

The glycerin content of the tube is reduced due to migration of plasticizer after the application of the aqueous dispersion.

The coating is applied by continuously contacting the inside surface of the tube with the liquid filled into it, so that a liquid composed of aqueous polymer dispersion remains on the inside surface of the entire tube. The tube coated in this manner is then continuously guided through a drier at a speed of 7 m/min. The temperature at the input portion of the drier is 560° C. and at its output portion 250° C. The heat dries the tube and causes the formation of a coating of polymer on the inside of the tube wall. after drying, the tube has a residual water content of about 3 percent by weight, based on the total weight of the tube.

Then a certain amount of water is applied to the surface of the tube, for example by spraying, so that the tube reaches a water content of approximately 10 percent by weight, based on its total weight.

The tube contains about 22 percent by weight of glycerin as a plasticizer, based on the total weight of the tube.

The tube is very flexible and is suitable for use as a synthetic sausage casing. The coating on the inside surface of the tube wall has a thickness that corresponds to a weight of 7.2 g of polymer per $m^2$ of tube surface. The coating produces a permeability of the tube to water vapor of only 0.8 $g/m^2 \cdot 24$ h as well as a permeability to oxygen of only 10 $cm^3/m^2 \cdot 24$ h·bar.

A sample of the tube is boiled for 20 hours in water. Thereafter, the coating does not detach itself from the tube.

Another section of the tube is, for 20 minutes, subjected to the effect of water having a temperature of 80° C. After this treatment, the coating still has its original transparency.

After filling the tube with sausage meat, for example with liver sausage, and then scalding it with hot water, plump sausages are obtained which are storable and do not lose weight after a longer storage period. The casing can easily be removed from the sausage meat.

EXAMPLE 2

The only difference from example 1 is that the polymer of the aqueous dispersion that is capable of forming a film consists of 90 percent by weight of vinylidene chloride, 1 percent by weight of acrylic acid, and 9 percent by weight of ethyl acrylate. The relative viscosity of the copolymer depends on its concentration in tetrahydrofuran, represented by the curve "Type a" in the diagram on page 25.

EXAMPLE 3

This example differs from example 1 in that the 14 percent by weight aqueous polymer dispersion contains a polymer mixture in the ratio 1:1, the first of the polymers consisting of 85 percent by weight of vinylidene chloride, 2 percent by weight of acrylic acid, 6 percent by weight methyl acrylate, and 7 percent by weight of butyl acrylate based on the total weight of the first copolymer, the second polymer consisting of a copolymer of 90 percent by weight of vinylidene chloride, 1 percent by weight of acrylic acid, and 9 percent by weight of methylacrylate, based on the total weight of the second copolymer. The dependence of the relative viscosity of the first copolymer on its concentration in tetrahydrofuran corresponds to the curve "Type b" in the diagram on page 25 and of the second copolymer to the curve "Type a" in the same diagram. The above mentioned aqueous dispersion furthermore contains 4 percent by weight of glycerin, based on the total weight of the dispersion, as well as 10 mg of silicone defoaming agent per 100 liters of the aqueous dispersion.

The tube is passed through the drier at 8 m/min and is then sprayed with water in such a manner that, after the spraying, it contains 11 percent by weight of water and 21 percent by weight of glycerin, both percentages being based on the total weight of the tube.

The coating on the inside surface of the tube wall has a thickness that corresponds to a weight of 8 g of the mixture of copolymers per $m^2$ of coated area of the tube. The permeability to water vapor of the tube is 1.2 $g/m^2 \cdot 24$ h, its permeability to oxygen is 12 $cm^3/m^2 \cdot 24$ h·bar.

After boiling the tube for 20 hours the coating does not detach itself from the tube. The film is very flexible and has a stretchability of about 16 percent. After treating the tube with hot water for 20 minutes, the coating still has its original transparency.

EXAMPLE 4

This example differs from example 3 in that the quantity ratio between the first and the second copolymer in the aqueous dispersion in 4:1. The coating has the same properties as in example 3, but has a stretchability of about 20 percent.

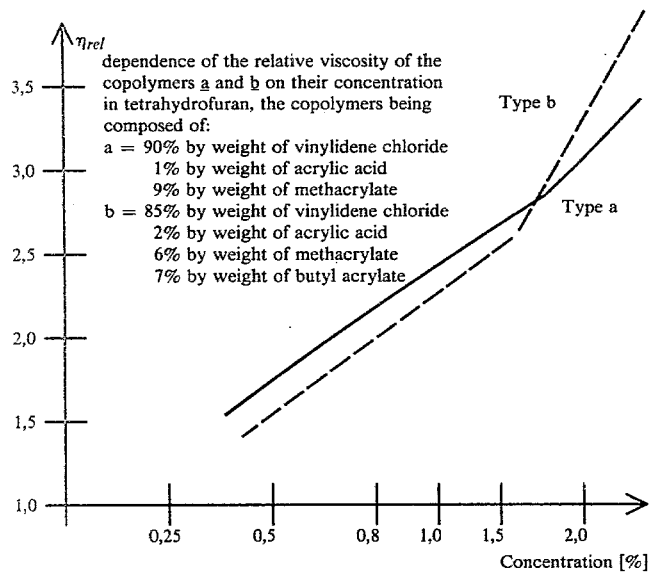

What is claimed is:

1. A process for the production of a regenerated cellulose tube containing a portion of water and chemical plasticizer wherein a liquid aqueous copolymer dispersion containing polyvinylidene chloride is continuously applied to the inside surface of a tube composed of regenerated cellulose, characterized in that a liquid coating is applied to the inside surface of the wall of a tube on the basis of cellulose hydrate that is in its gelled state, the coating being composed of an aqueous copolymer dispersion the dispersed portion of which consists of a copolymer obtained by copolymerization of a mixture of polymerizable monomers, this mixture consisting of 70 to 92 percent by weight of vinylidene chloride and of 8 to 30 percent by weight of acrylic acid and acrylic acid ester, or acrylic acid and methacrylic acid ester, or acrylic acid, acrylic acid ester and methacrylic acid ester, or methacrylic acid and acrylic acid ester, or methacrylic acid and methacrylic acid ester, or methacrylic acid, acrylic acid ester and methacrylic acid ester, after which the tube is dried by heating in a single step heating action, and then wetted with water.

2. The process as defined in claim 1, wherein the dispersed substance of the aqueous dispersion consists of a copolymer of 90 percent by weight of vinylidene chloride, 1 percent by weight of acrylic acid, and 9 percent by weight of acrylic acid ester or methacrylic acid ester.

3. The process as defined in claim 1, wherein the dispersed substance of the aqueous dispersion is composed of a copolymer of 90 percent by weight of vinylidene chloride, 1 percent by weight of acrylic acid, and 9 percent by weight of acrylic acid methyl ester.

4. The process as defined in claim 1, wherein the tube wall is filter-reinforced.

5. Process for the production of tube based on regenerated cellulose which comprises applying a liquid layer to the inside surface of a tube based on regenerated cellulose which is in its gelled state, said liquid layer consisting of an aqueous dispersion the dispersed portion of which is composed of a mixture of a first and a second copolymer in a ratio of 1:1 to 4:1, the first copolymer consisting of 90 percent by weight of vinylidene chloride, 1 percent by weight of acrylic acid, and 9 percent by weight of acrylic and methyl ester, and the second copolymer consisting of 85 percent by weight of vinylidene chloride, 2 percent by weight of acrylic acid, 6 percent by weight of acrylic acid methyl ester, and 7 percent by weight of acrylic acid butyl ester, after which the tube is dried by heating in a single step heating action, and then wetted with water.

6. The process according to claim 5, wherein the ratio of the first and second copolymers in the dispersion is 1:1.

7. The process according to claim 5, wherein the ratio of the first and second copolymers in the polymer dispersion is 4:1.

8. The process according to claim 5, wherein the tube wall is fiber-reinforced.

* * * * *